United States Patent
Fujino et al.

(10) Patent No.: US 12,521,408 B2
(45) Date of Patent: Jan. 13, 2026

(54) COMPOSITION FOR ENHANCING IMMUNE FUNCTION

(71) Applicant: Institute of Rheological Function of Food Co., Ltd., Fukuoka (JP)

(72) Inventors: Takehiko Fujino, Fukuoka (JP); Shiro Mawatari, Fukuoka (JP); Shamim Niwase, Fukuoka (JP); Minoru Fujino, Fukuoka (JP); Hiromi Nyuzuki, Niigata (JP)

(73) Assignee: INSTITUTE OF RHEOLOGICAL FUNCTION OF FOOD CO., LTD., Fukuoka (JP)

( * ) Notice: Subject to any disclaimer, the term of this patent is extended or adjusted under 35 U.S.C. 154(b) by 578 days.

(21) Appl. No.: 17/921,501

(22) PCT Filed: Apr. 27, 2021

(86) PCT No.: PCT/JP2021/016826
§ 371 (c)(1),
(2) Date: Oct. 26, 2022

(87) PCT Pub. No.: WO2021/221066
PCT Pub. Date: Nov. 4, 2021

(65) Prior Publication Data
US 2023/0158050 A1  May 25, 2023

(30) Foreign Application Priority Data
Apr. 28, 2020 (JP) ................. 2020-078984

(51) Int. Cl.
*A61P 37/04* (2006.01)
*A61K 31/685* (2006.01)
*A61P 31/04* (2006.01)
*A61P 31/12* (2006.01)
*A61P 31/22* (2006.01)

(52) U.S. Cl.
CPC ............ *A61K 31/685* (2013.01); *A61P 31/04* (2018.01); *A61P 31/22* (2018.01); *A61P 37/04* (2018.01)

(58) Field of Classification Search
CPC ................. A61P 37/04; A61P 31/12
See application file for complete search history.

(56) References Cited

U.S. PATENT DOCUMENTS

2018/0327433 A1  11/2018  Fujino et al.
2021/0238208 A1   8/2021  Fujino et al.

FOREIGN PATENT DOCUMENTS

WO  WO 2016/092878 A1  6/2016
WO  WO 2019/208392 A1  10/2019

OTHER PUBLICATIONS

ISR for PCT/JP2021/016826, dated Jun. 8, 2021.
Fujino et al., "Efficacy and Blood Plasmalogen Changes by Oral Administration of Plasmalogen in Patients with Mild Alzheimer's Disease and Mild Cognitive Impairment: A Multicenter, Randomized, Double-blind, Placebo-controlled Trial", EBioMedicine, 17:199-205 (Mar. 2017).
Hossain et al., "Plasmalogen-Mediated Activation of GPCR21 Regulates Cytolytic Activity of NK Cells against the Target Cells", The Journal of Immunology, 209(2):310-325 (Jul. 2022).
Ni et al., "Synthesis and evaluation of immunostimulant plasmalogen lysophosphatidylethanolamine and analogues for natural killer T cells", Bioorganic & Medicinal Chemistry, 22(11):2966-2973 (2014).
Huang et al., "Effect of plasmalogen on improvement of vaginitis in rats with mixed infection", *Chin. J. Nosocomiol.*, vol. 29, No. 18, pp. 2731-2735 (2019), including English language abstract.
Bams-Mengerink et al., "MRI of the brain and cervical spinal cord in rhizomelic chondrodysplasia punctata", *Clinical Neurology*, vol. 2, pp. 42-43 (2006).
Office Action issued in CN Patent Appl. No. 202180031509.0, dated Mar. 12, 2024, along with an English translation thereof.
Office Action dated May 7, 2025, issued in Japanese patent application No. 2022-009164, with English machine translation thereof.
Haji et al., "Significance of immunonutrition on attenuation of surgical infection after liver resection from the viewpoint of immunological and metabolic preconditioning," *Japan Society for Surgical Infection Magazine*, 2010, vol. 7, No. 3, p. 231-237. English abstract.

*Primary Examiner* — Bruck Kifle
(74) *Attorney, Agent, or Firm* — Greenblum & Bernstein, P.L.C.

(57) ABSTRACT

It is a composition for enhancing immune function, or a composition for activating natural killer cells, comprising plasmalogen.

16 Claims, 5 Drawing Sheets

COMPOSITION FOR ENHANCING IMMUNE FUNCTION

TECHNICAL FIELD

The present invention relates to a composition that enhances immune function, by activating natural killer cells.

BACKGROUND ART

Plasmalogen is known for its action of promoting neurogenesis, action of suppressing nerve inflammation due to lipopolysaccharides (LPS), action of suppressing accumulation of amyloid β (Aβ) protein in brain, etc., and it is said to have effect on cranial nerve disorders such as Alzheimer's disease, Parkinson's disease, depression, and schizophrenia. For example, in non-patent reference 1, it is reported that in patients having orally administered scallop derived-purified plasmalogen, memory function of mild Alzheimer's disease are ameliorated.

On the other hand, innate immune function is critical against new types of virus, etc. such as novel coronavirus (SARS corona virus-2, SARS-CoV-2), and it is necessary to strengthen this innate immune function.

PRIOR ART REFERENCE

Non-Patent Reference

[Non-patent reference 1] Fujino T. et al, "Efficacy and Blood Plasmalogen Changes by Oral Administration of Plasmalogen in Patients with Mild Alzheimer's Disease and Mild Cognitive Impairment: A Multicenter, Randomized, Double-blind, Placebo-controlled Trial" EBioMedicine, [17] (2017) 199-205

DISCLOSURE OF THE INVENTION

Object to be Solved by the Invention

As stated above, various reports related to plasmalogen have been reported, while effect of plasmalogen on innate immune function has not been studied in detail.

The object of the present invention is to provide a composition that activates natural killer cells, and exerts an excellent effect of enhancing immune function.

Means for Solving the Object

The present inventors have conducted a keen study to solve the above object, and found out that plasmalogen can activate natural killer cells, which are one type of lymphocytes that act as main factor of innate immunity. The present invention has been thus completed.

Specifically, the present invention is as follows:

[1] A composition for enhancing immune function comprising plasmalogen.
[2] A composition for activating a natural killer cell comprising plasmalogen.
[3] An anti-infective composition comprising plasmalogen.
[4] The composition for enhancing immune function according to [1], wherein the plasmalogen is a plasmalogen extracted from an animal tissue.
[5] The composition for activating a natural killer cell according [2], wherein the plasmalogen is a plasmalogen extracted from an animal tissue.
[6] The anti-infective composition according to [3], wherein the plasmalogen is a plasmalogen extracted from an animal tissue.

Effect of the Invention

The composition of the present invention activates natural killer cells, and exerts an excellent effect of enhancing immune function.

MODE FOR PRACTICING THE INVENTION

Figure 1:
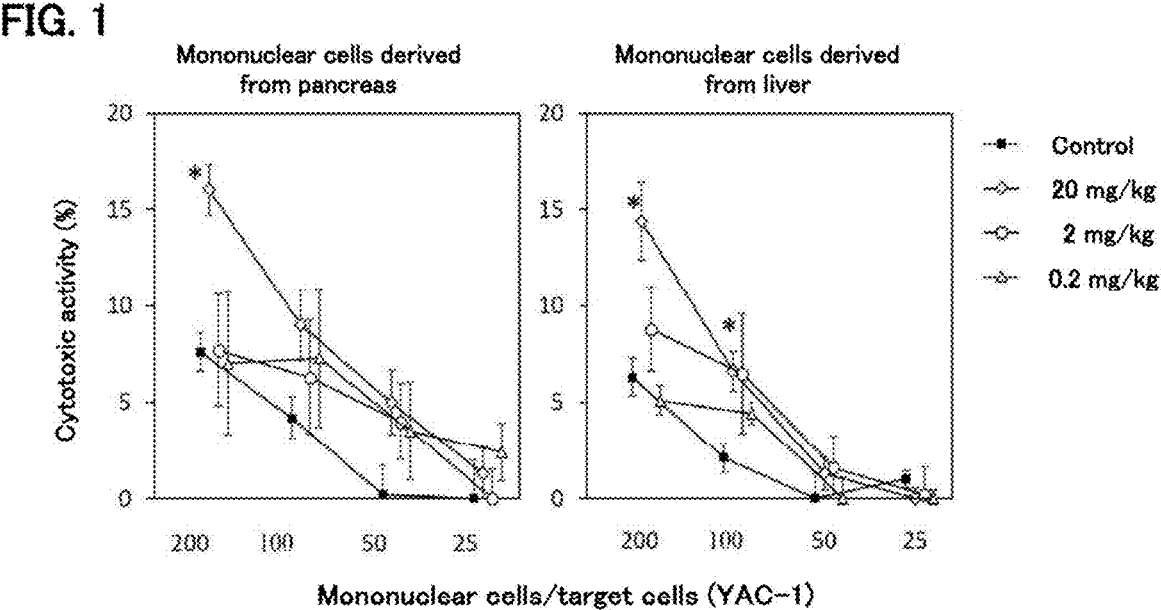
FIG. 1 shows graphs showing results of cytotoxic activity of mononuclear cells derived from mouse pancreas and liver administered with plasmalogen against target cells.

The composition of the present invention is characterized by comprising plasmalogen.

The composition of the present invention activates natural killer cells (NK cells) which are one type of lymphocytes that act as a main factor of innate immunity, and enhances innate immune function. Therefore, anti-infective effect against viruses, bacteria, etc. can be expected. Specifically, the composition of the present invention is useful as a composition for enhancing immune function, a composition for activating natural killer cells, or an anti-infective composition (anti-infective agent) such as an antibacterial composition (antibacterial agent), an antiviral composition (antiviral agent). Here, anti-infection in the present invention is a concept comprising prevention of infection of viruses, bacteria, etc. in a healthy individual, and alleviation or treatment of infection symptoms in an infected individual.

Further, with the composition of the present invention, an effect of ameliorating symptoms such as fever etc. in patients with Rhizomelic Chondrodysplasia Punctata (RCDP) and it can be also used as a composition for ameliorating symptoms of RCDP.

Plasmalogen is one type of phospholipid having an antioxidant effect, and is one of glycerophospholipid. It is a unique subclass of glycerophospholipid characterized by having a vinyl-ether linkage in the sn-1 position of glycerol backbone. It is observed at a high concentration in cell membrane in tissues of many mammals.

The plasmalogen used in the present invention is not particularly limited as long it is generally classified as plasmalogen, and examples include choline plasmalogen, ethanolamine plasmalogen, inositol plasmalogen, and serine plasmalogen. Among these, choline plasmalogen and ethanolamine plasmalogen are preferable, and ethanolamine plasmalogen is particularly preferable.

The plasmalogen of the present invention can be extracted from animal tissues. Animal tissues are not particularly limited as long it comprises plasmalogen, and examples include aquatic animals such as shellfish, sea squirt, sea cucumber, salmon, skipper and bonito, and birds. Among these, shellfish, sea squirt, and birds are preferable, and shellfish are particularly preferable. As parts to be used, edible part (part that can be eat) is preferable. These animal tissues can be cut products, but it is preferable to use ground products since plasmalogen can be extracted more efficiently.

Examples of shellfish include edible clams such as scallops, mussels, and abalone, and snails, and scallops are particularly preferable. Scallops are edible clams belonging to Pectinidae, and for example, those belonging to the genus *Mizuhopecten*, and the genus Pecten can be exemplified. Specifically, common scallop (scientific name: *Mizuhopecten yessoensis*) collected in Japan, or European scallop (scientific name: Pecten maximus (Linnaeus)) collected in Europe can be exemplified. As edible parts, scallop eye and strings can be exemplified.

Sea squirts are edible chordates belonging to Pyuridaethe, and those belonging to the genus Haloncynthia, the genus Halocynthia aurantium can be exemplified. Specifically, Maboya (scientific name: Haloncynthia roretzi) and Akaboya (scientific name: Halocynthia aurantium) can be exemplified. As edible parts, meats (fascia) can be exemplified.

Birds are not particularly limited as long as it is edible birds, and for example, chicken, silky fowl and canard can be exemplified. As edible parts, breast meat comprising plasmalogen in abundance is preferable.

Extraction of plasmalogen can be performed by using water, organic solvent, and water-containing organic solvent, and it is preferable to perform enzyme treatment in combination. For example, ethanol extraction method, and hexane extraction method can be exemplified, and ethanol extraction method is preferable.

Ethanol extraction method is not particularly limited as long it is a method of extracting using ethanol (including water-containing ethanol), and examples include methods described in Japanese published unexamined application No. 2019-140919, Japanese published unexamined application No. 2018-130130, Republished patent No. 2012-039472, Japanese published unexamined application No. 2010-065167, and Japanese published unexamined application No. 2010-063406, etc.

Hexane extraction method is not particularly limited as long as it is a method of extracting using hexane, and examples include methods described in Republished patent No. 2009-154309, Republished Patent No. 2008-146942, etc.

The composition of the present invention can be used for example as medicine (including quasi-drug), or as so-called health food products such as functional foods which indication of efficacy is allowed from a prescribed authority, including foods for specified health use, foods with nutrient function claims, foods with function claims, or the like.

When using the composition of the present invention as medicine or health food products, the composition of the present invention is not particularly limited as long as it can be distinguished from other products as product, in the point of comprising plasmalogen, and being used for enhancing immune function, for activating natural killer cells, and/or for anti-infection, and for example those with an indication or suggestion of having a function of enhancing immune function, function of activating natural killer cells and/or anti-infective function on any of the main body, package, instructions, advertisement of the product of the present invention are encompassed in the scope of the present invention.

The composition of the present invention can be for oral use or for parental use such as injection or infusion. However, from the point that it can be readily intake, it is preferable to be for oral use. In case it is for oral use, examples of the form include tablet form, capsule form, powder form, granule form, liquid form, grain form, bar form, plate form, block form, solid form, pellet form, paste form, cream form, caplet form, gel form, chewable form, stick form, or the like. Among these, capsule form is preferable.

As for the content of plasmalogen in the composition of the present invention, it can be appropriately comprised within the scope with which the effect is exerted. It depends on the form, but for example it is preferable that plasmalogen is $10^{-10}$% by mass or more of the whole composition of the present invention, in terms of dry mass equivalent, more preferable to be $10^{-5}$% by mass or more, further preferable to be 0.1% by mass or more, and particularly preferable to be 1.0% by mass or more.

The amount of intake of the oral composition of the present invention is not particularly limited. However, from the viewpoint to more significantly exert the effect of the present invention, it is preferable to intake so that the amount of intake of plasmalogen of an adult per day is $10^{-6}$ μg or more per day, more preferable so that it is 1 μg or more per day, further preferable so that it is 500 μg or more per day, and particularly preferable so that it is 1000 μg or more per day. The upper limit is for example 20,000 μg per day, and preferably 10,000 μg per day.

The oral composition of the present invention can be stored in one container, or for example in plural containers of 2 to 3, so that the amount of intake per day becomes the above-mentioned amount of intake, for one day.

The composition of the present invention can be produced by known methods by adding ingredients other than the ingredients of the present invention according to need. Examples of ingredients other than the ingredients of the present invention include vitamin, mineral, protein, peptide, amino acid, animal oil, and vegetable oil.

In the following, the present invention will be explained in detail based on the Examples.

Example 1

Activity of NK cells (NK activity) by plasmalogen was assessed by using mouse.

[Plasmalogen]

As plasmalogen, hexane-extracted ethanolamine plasmalogen (mainly comprising ethanolamine plasmalogen, and comprising choline plasmalogen as well) prepared from common scallop (scientific name *Mizuhopecten yessoensis*) by the following method was used.

1. Raw scallop string was added with Kokulase P (manufactured by Mitsubishi-Chemical Foods Corporation) and phospholipase A1 (PLA1) (manufactured by Mitsubishi-Chemical Foods Corporation) and mixed.
2. Then, hexane/isopropanol was added, and the supernatant was subjected to suction filtration.
3. Aqueous solution of sodium sulfate was added and mixed well.
4. The upper layer was dried hard with a rotary evaporator.
5. Acetone cooled down to 4° C. was added and mixed.
6. The resultant was centrifuged at 3000 rpm, for 10 min, at 4° C.
7. The supernatant was discarded, and the precipitate was collected.
8. The resultant was dried overnight with a desiccator.

[Administration of Plasmalogen to Mouse]

7 weeks-old C57BL/6J male mice purchased from Oriental Yeast Co., Ltd. were used. During the whole experiment period, mice were bred in SPF (Specific pathogen free) environment in an Institute of Laboratory Animals.

Plasmalogen dissolved in corn oil was orally administered at 200 µl/mouse to four groups of mice, three mice in each group (plasmalogen, 20, 2, 0.2 mg/kg) for 4 days. For only the group of 0.2 mg/kg, experiment was performed at n=2. As a control, corn oil free of plasmalogen was administered.

[Isolation of Mononuclear Cells]

Pancreas and liver were extracted from mice.

Pancreas and liver were each added with 10 ml of 3% FCS-RPMI on a metal mesh (0.12×80, sieve 0.2 mm) of 10 cm petri dish, and ground. The liquid was transferred to a 50 ml-tube, centrifuged at 1500 rpm for 5 minutes.

Cell pellet of the obtained pancreas was added with 1 ml of lysing buffer, to dissolve erythrocytes. Then, 10 ml of 3% FCS-RPMI was added, centrifuged at 1500 rpm for 5 minutes to obtain mononuclear cells.

On the other hand, for liver, pellet obtained by grinding with metal mesh was suspended to 33% Percoll liquid, and the resultant was centrifuged at 1800 rpm for 15 minutes. The obtained pellet was added with 1 ml of lysing buffer to dissolve erythrocytes. The resultant was transferred to a 15 ml-tube, added with 10 ml of 3% FCS-RPMI, and centrifuged at 1500 rpm for 5 minutes to obtain mononuclear cells of liver.

[Measurement of NK Activity]

NK cell activity was measured by Cr release assay of 4 hours using NK sensitive cell strain YAC-1 as target cell. YAC-1 was cultured for 1 hour in the presence of $Na^{51}CrO_4$, and after labelling the cells with $^{51}Cr$, the cells were suspended in RPMI 1640 medium containing 10% fetal calf serum (FCS) in $1\times10^5$ cells/ml. Mononuclear cells separated from mouse pancreas and liver, were each suspended to culture solution according to Effector (mononuclear cells): Target (YAC-1) ratio. 100 µl of each was mixed in 96-well round-bottomed microtiter plate (NUNC, Roskilde, Denmark), the resultant was cultured for 4 hours at 37° C. in the presence of 5% $CO_2$, in humidified air. Then, the supernatant was collected, and γ dose of the liquid was measured. The percentage of specific lysis was calculated based on the following formula.

% specific lysis=(experimental release−spontaneous release)/(maximal release−spontaneous release)× 100

FIG. 1 shows the results of cytotoxic activity of mononuclear cells derived from mouse pancreas and liver against target cells. The results are shown as mean level±SD, obtained for each mouse in each group.

As shown in FIG. 1, it was observed that mononuclear cells of mouse administered with plasmalogen have higher cytotoxic activity against NK sensitive cell strain YAC-1, as compared to mononuclear cells of control. Specifically, it has been revealed that by the oral administration of plasmalogen, NK cells are activated. Therefore, it is thought that immune function is enhanced by the administration of plasmalogen, and anti-infective effect against viruses, bacteria, etc. can be expected.

Example 2

Increase of interferon (IFN) expression by plasmalogen was assessed by using mouse.

[Plasmalogen]

As plasmalogen, ethanol-extracted ethanolamine plasmalogen (mainly comprising ethanolamine plasmalogen, and comprising choline plasmalogen as well) prepared from common scallop (scientific name *Mizuhopecten yessoensis*) by the following method was used.

1. Raw scallop string was added with Kokulase P (manufactured by Mitsubishi-Chemical Foods Corporation) and mixed.
2. Then, ethanol was added, and the supernatant was subjected to suction filtration.
3. The filtrate was dried hard with a rotary evaporator.

[Administration of Plasmalogen to Mouse]

7 weeks-old C57BL/6J male mice purchased from Oriental Yeast Co., Ltd. were used. During the whole experiment period, mice were bred in SPF environment in an Institute of Laboratory Animals.

Plasmalogen dissolved in water (1 mg/kg/day) was orally administered to 5 mice for 6 weeks. The group of control was administered with water.

[Measurement of Interferon-7 (IFN-γ) Expression Level]

Brain was excised from mouse, and the expression level in interferon-γ (IFN-γ) of brain cortex was confirmed by real time PCR.

Figure 2:
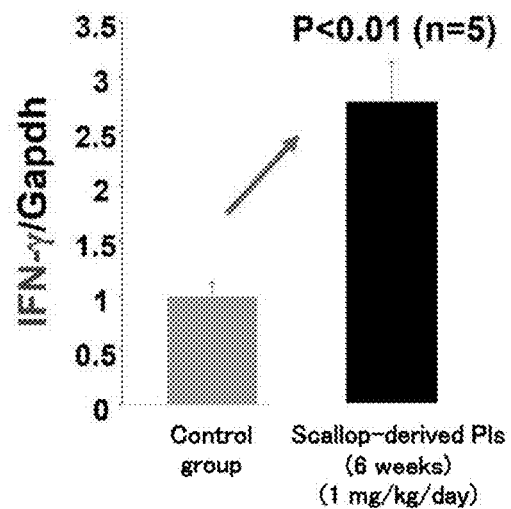
FIG. 2 is a graph showing expression results of interferon-γ (IFN-γ) in brain cortex of mouse administered with plasmalogen.

The results are shown in FIG. 2.

As shown in FIG. 2, the IFN-γ expression in the brain cortex of mouse administered with plasmalogen was significantly increased as compared to control. Specifically, it was confirmed that the expression of interferon-γ related to suppression of infection of viruses, etc. increases by the administration of plasmalogen.

Example 3

Effect of suppressing viral infection by plasmalogen was assessed by using mouse.

[Plasmalogen]

As plasmalogen, ethanolamine plasmalogen extracted with ethanol similarly as in Example 2 was used.

[Administration of Plasmalogen to Mouse]

Mice were bred similarly as in Example 2.

Plasmalogen dissolved in water (0.02, 1, 10 mg/kg/day) was orally administered to mice (n=4) for 5 weeks. Drinking water not containing plasmalogen was administered to control mice.

[Assessment of Viral Infection to Mouse]

Murid herpes virus 1 (ATCC (R) VR-1399™) was intraperitoneally injected to mice at a concentration of $1 \times 10^8$ pfu (Plaque-Forming Unit). Mice were sacrificed 72 hours after, and each tissue of lung, pancreas, and liver were extracted.

RT-PCR (reverse transcription Polymerase Chain Reaction) using virus specific primer was performed to the extracted genome DNA of each tissue, to amplify viral DNA. In the PCR method, equal amount of genome DNA (100 ng) from each group was used. Genome DNA of Gapdh gene (Glyceraldehyde 3-phosphate dehydrogenase) was amplified by PCR method, and used as internal control.

Figure 3:
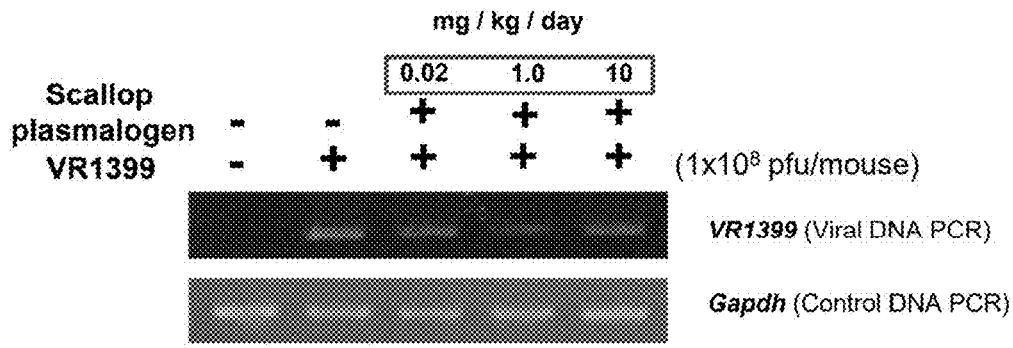
FIG. 3 is a figure showing results of RT-PCR of viral DNA in lung tissues of mouse administered with plasmalogen.
Figure 4:
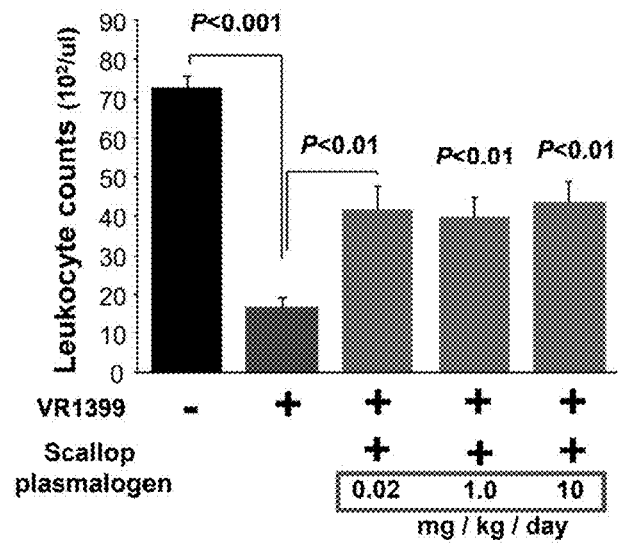
FIG. 4 is a graph showing leukocyte counts in blood of mouse administered with plasmalogen.

Results of RT-PCR of viral DNA in lung tissues of mouse are shown in FIG. 3. Leukocyte counts in blood of mouse are shown in FIG. 4. Further, measurement results of pancreas weight of mouse are shown in FIG. 5.

As shown in FIG. 3, in lung tissues of control group not administered with plasmalogen, significant increase of viral DNA was observed. On the other hand, in lung tissues of mice administered with plasmalogen, significant decrease of viral DNA as compared to control group was confirmed. Therefore, it has been revealed that viral infection of mouse is suppressed by the administration of plasmalogen.

As shown in FIG. 4, in control group not administered with plasmalogen, leukocyte counts in blood were largely decreased by viral infection. On the other hand, in mice administered with plasmalogen, decrease of leukocyte counts in blood was significantly suppressed as compared to control group. Therefore, it has been suggested that viral infection of mouse is suppressed by the administration of plasmalogen.

Figure 5:
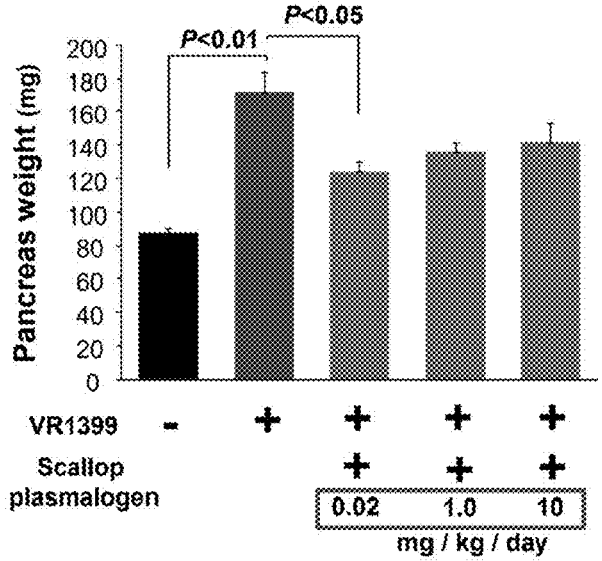
FIG. 5 is a graph showing pancreas weight of mouse administered with plasmalogen.

As shown in FIG. 5, significant increase of pancreas weight was observed by viral infection in control group not administered with plasmalogen. On the other hand, in mice administered with plasmalogen, increase of pancreas weight was significantly suppressed as compared to control group. Therefore, it has been suggested that viral infection of mouse is suppressed by the administration of plasmalogen.

From the above, it is thought that NK activity is enhanced, and anti-infective effect against viruses etc. is exerted by the administration of plasmalogen.

Example 4

Influence on bacterial infection by lack of plasmalogen was investigated.

For wild-type (WT N2) nematodes with normal genes and nematodes lacking plasmalogen-producing genes (acl-7, ads-1, fard-1), resistance against causative bacteria P. aeruginosa, and S. aureus was compared.

Specifically, it was confirmed as follows.

1. P. aeruginosa and S. aureus were cultured overnight in L B medium.
2. Nematode Growth Medium (NGM) agar medium was provided, the above suspension was applied to a part thereof, and stand at 37° C. for 24 hours, and further at 25° C. for 24 hours.
3. Adult nematodes were cultured in the above medium, the life and death were confirmed to obtain the survival rate.

Figure 6:
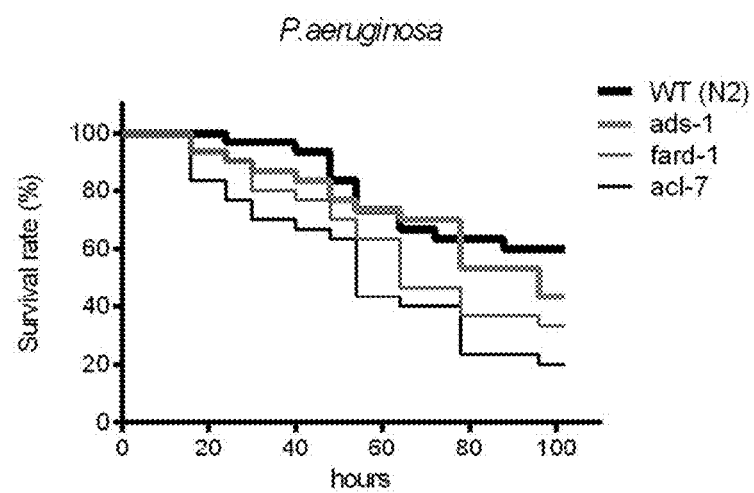
FIG. 6 is a graph showing survival rate of nematodes with normal genes, and nematodes lacking plasmalogen producing-genes, when infected with *Pseudomonas aeruginosa*.
Figure 7:
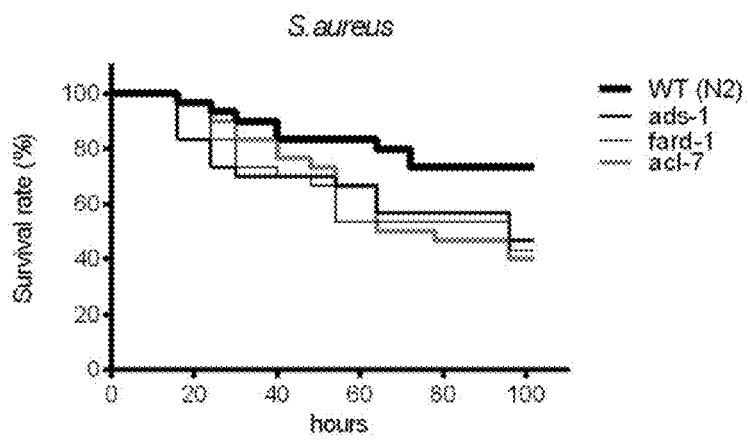
FIG. 7 is a graph showing survival rate of nematodes with normal genes, and nematodes lacking plasmalogen producing-genes, when infected with *Staphylococcus aureus*.

The survival rate of nematodes infected with P. aeruginosa is shown in FIG. 6, and the survival rate of nematodes infected with S. aureus is shown in FIG. 7.

As shown in FIG. 6 and FIG. 7, the survival rate of nematodes lacking plasmalogen producing-genes when infected with P. aeruginosa and S. aureus was significant low as compared to wild-type. Therefore, it has been suggested that plasmalogen exerts anti-infective effect against bacteria.

Example 5

NK activity in human by plasmalogen was assessed.
[Plasmalogen]
As plasmalogen, ethanolamine plasmalogen extracted similarly as in Example 2 was used.
[Administration of plasmalogen]
The four test subjects were as follows: 32 years old, male, having adiposity; 52 years old, female, having anxiety disorder; 73 years old, male, having diabetes; and 59 years old, male, having hyperlipemia. Hard capsule agent containing 0.5 mg of plasmalogen was administered to the test subjects for 4 days, 2 capsules every morning and every afternoon, that is a total of 2 mg (2 mg/day).
[NK activity]
Measurement of NK activity was entrusted to BML, INC. The test method was performed by 51 Cr. Release assay.

Figure 8:
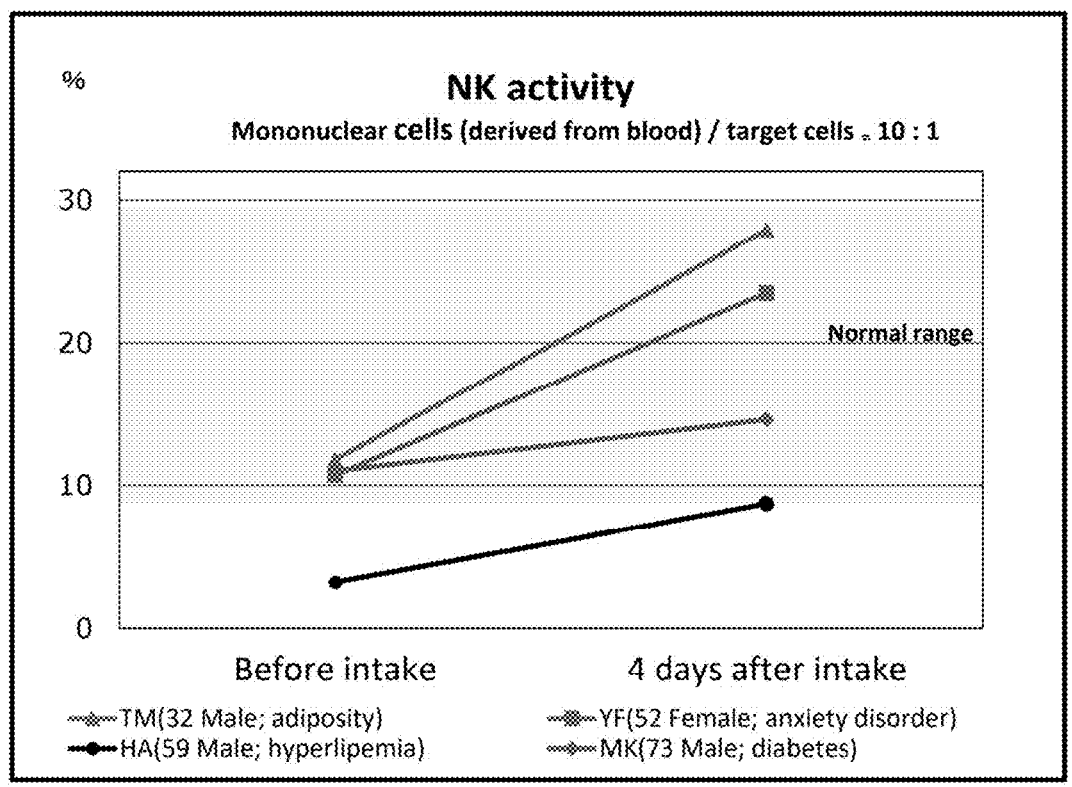
FIG. 8 is a graph showing the activity of natural killer cells (NK activity) of mononuclear cells derived from blood of human administered with plasmalogen (mononuclear cells:target cells=10:1).
Figure 9:
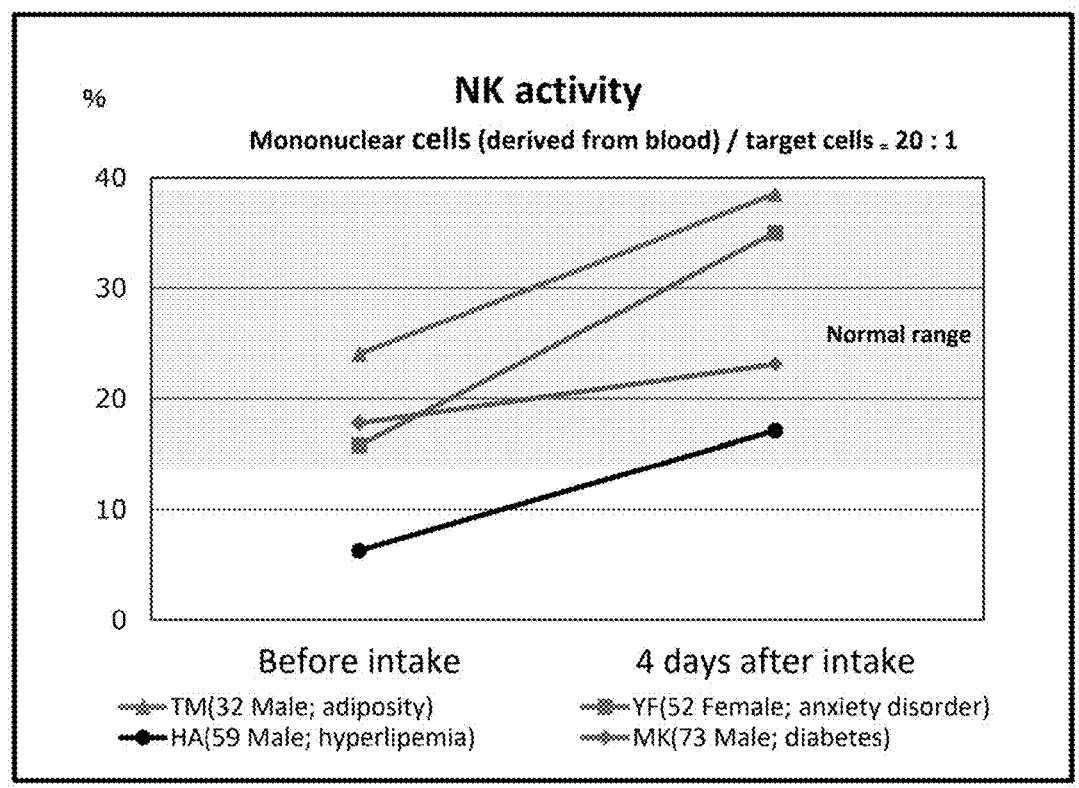
FIG. 9 is a graph showing the activity of natural killer cells (NK activity) of mononuclear cells derived from blood of human administered with plasmalogen (mononuclear cells:target cells=20:1).

Results of NK activation of mononuclear cells derived from human blood are shown in FIGS. 8 and 9. FIG. 8 shows the results of when the ratio of mononuclear cells:target cells is 10:1; FIG. 9 shows the results of when the ratio of mononuclear cells:target cells is 20:1.

As shown in FIGS. 8 and 9, it has been confirmed that at day 4 after intake of plasmalogen, NK activity of all test subjects is increased. Specifically, it can be expected that by the administration of plasmalogen to human, NK cells are activated, and the immune function is enhanced.

Example 6

Frequency of catching a cold in human with plasmalogen was assessed.
[Plasmalogen]
As plasmalogen, ethanolamine plasmalogen extracted with ethanol similarly as in Example 2 was used.
[Administration of Plasmalogen to Human]
The test subjects were as follows: 10 men and 23 women (total of 33) seeing a doctor regularly at a clinic. A hard capsule agent containing 0.5 mg of plasmalogen was administered to the test subjects, one capsule every morning and every afternoon, that is in an amount of 1 mg (1 mg/day) for 12 months.
[Assessment of Frequency of Catching a Cold]
The test subjects had a questionnaire for how many times they caught a cold per year, before intake of plasmalogen, after initiating plasmalogen intake for 12 months.

Figure 10:
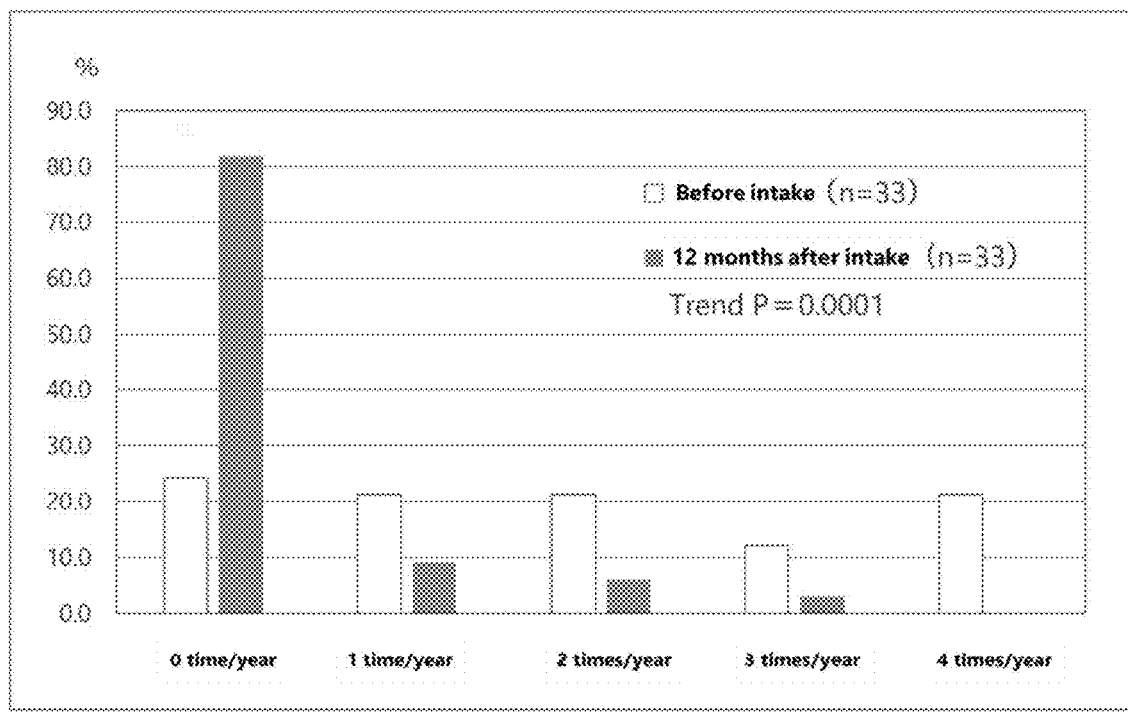
FIG. 10 is a graph showing the frequency of catching a cold of a human having intake plasmalogen.

The frequency of catching a cold before intake of plasmalogen, and during 12 months after initiating plasmalogen intake is shown in FIG. 10.

As shown in FIG. 10, before taking plasmalogen, the frequency of catching a cold for 21.2% of the test subjects was 4 times per year, while after 12 months of taking plasmalogen, test subjects with a frequency of catching a cold of 4 times per year was 0%, and a significant decrease in frequency of catching a cold was confirmed. Further, in the trend test, a statistically significant decrease (Trend P=0.0001) was observed. Therefore, it is thought that NK activity is enhanced, and anti-infective effect against viruses, etc. is exerted by the administration of plasmalogen to human.

Example 7

Rhizomelic Chondrodysplasia Punctata (RCDP) patient whose concentration of plasmalogen in blood has decreased, and having viral infection was administered with plasmalogen, and the influence was assessed.

[Plasmalogen]

As plasmalogen, ethanolamine plasmalogen extracted with ethanol similarly as in Example 2 was used.

[Administration of Plasmalogen to RCDP Patient]

The test subject was a 3 years-old girl, being a RCDP patient. At the initiation of administration, plasmalogen was administered in an amount of 0.25 mg/day, the administration amount was gradually increased, and administered at a maximum of 6.0 mg/day.

[Assessment of Concentration of Plasmalogen in Blood, CRP Inflammation Reaction and Frequency of Fever]

Blood was collected from the test subject before initiation of intake of plasmalogen, and after initiating intake, and concentration of plasmalogen in blood and CRP inflammation reaction were measured. Further, frequency of fever was confirmed as an index of viral infection.

Figure 11:
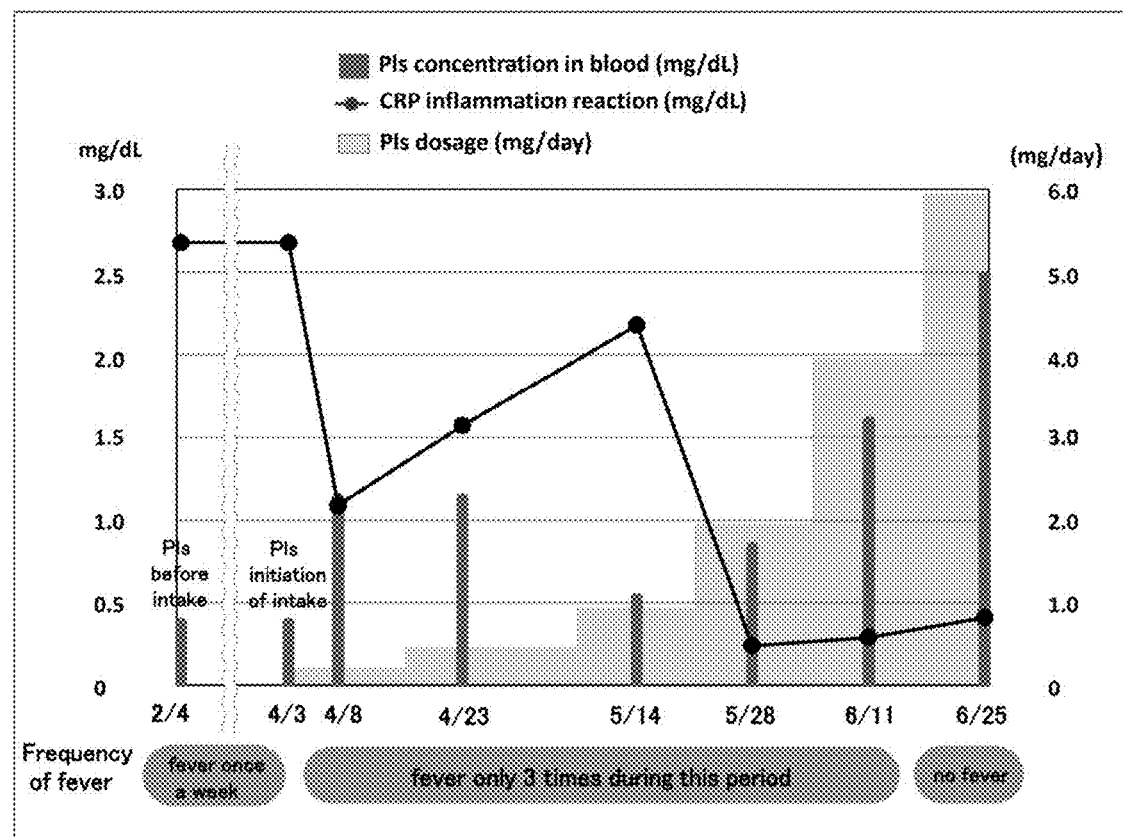
FIG. 11 is a graph showing the change in concentration of plasmalogen in blood, CRP inflammation reaction and frequency of fever in RCDP patient associated with intake of plasmalogen.

Change in concentration of plasmalogen in blood, CRP inflammation reaction and frequency of fever in RCDP patient associated with intake of plasmalogen is shown in FIG. 11.

As shown in FIG. 11, it has been confirmed that the concentration of plasmalogen in blood increased according to the increase of the dosage amount of plasmalogen. Further, CRP inflammation reaction decreased according to the continuation of plasmalogen intake. Furthermore, frequency of fever was once a week before intake of plasmalogen, but the number of times of fever during about 2 months after initiating intake was 3 times. Moreover, after increasing the dosage amount to 6.0 mg/day, no fever was observed. Further, before intake of plasmalogen, pneumonia thought to be caused by viral infection was frequently occurred in combination with fever, while no complicated pneumonia occurred after intake of plasmalogen. Specifically, it is thought that plasmalogen has an anti-infective effect against viruses, etc. in RCDP patient whose concentration of plasmalogen in blood is low.

From the results of the above Examples 1-7, it has been revealed that infection of viruses or bacteria can be prevented or ameliorated by the administration of plasmalogen. As action of mechanism of this prevention of infection or therapeutic effect, it can be thought that NK cells have been activated, and immune function has been enhanced by the administration of plasmalogen.

Example 8

Example of Composition

By the following composition, hard capsule agents have been produced.

Scallop extracted plasmalogen 0.5 mg
Cyclodextrin 3.3 mg
Amino acid 1.2 mg
Pine-Dex 185.0 mg

INDUSTRIAL APPLICABILITY

Since the composition of the present invention contributes to enhancing innate immunity, it is industrially useful.

The invention claimed is:

1. A method for enhancing immune function, comprising administering a composition comprising 500 μg to 20,000 μg per day of plasmalogen to a human in need of enhancement of immune function,
wherein the plasmalogen is administered orally, by injection, or by infusion.

2. The method according to claim 1, wherein the plasmalogen is a plasmalogen extracted from an animal tissue.

3. A method for activating a natural killer cell, comprising administering a composition comprising 500 μg to 20,000 μg per day of plasmalogen to a human in need of activation of a natural killer cell,
wherein the plasmalogen is administered orally, by injection, or by infusion.

4. The method according to claim 3, wherein the plasmalogen is a plasmalogen extracted from an animal tissue.

5. A method for suppressing infection of viruses or bacteria, comprising administering a composition comprising 500 μg to 20,000 μg per day of plasmalogen to a human in need suppressing of infection of viruses or bacteria,
wherein the plasmalogen is administered orally, by injection, or by infusion, and
wherein the method is a method of suppressing infection of Murid herpes virus 1, *P. aeruginosa*, or *S. aureus*.

6. The method according to claim 5, wherein the plasmalogen is a plasmalogen extracted from an animal tissue.

7. The method of claim 1, wherein the plasmalogen is selected from the group consisting of a choline plasmalogen, an ethanolamine plasmalogen, an inositol plasmalogen, and a serine plasmalogen.

8. The method of claim 3, wherein the plasmalogen is selected from the group consisting of a choline plasmalogen, an ethanolamine plasmalogen, an inositol plasmalogen, and a serine plasmalogen.

9. The method of claim 5, wherein the plasmalogen is selected from the group consisting of a choline plasmalogen, an ethanolamine plasmalogen, an inositol plasmalogen, and a serine plasmalogen.

10. The method of claim 1, wherein the plasmalogen is a choline plasmalogen or an ethanolamine plasmalogen.

11. The method of claim 3, wherein the plasmalogen is a choline plasmalogen or an ethanolamine plasmalogen.

12. The method of claim 5, wherein the plasmalogen is a choline plasmalogen or an ethanolamine plasmalogen.

13. The method of claim 1, wherein the plasmalogen is an ethanolamine plasmalogen.

14. The method of claim 3, wherein the plasmalogen is an ethanolamine plasmalogen.

15. The method of claim 5, wherein the plasmalogen is an ethanolamine plasmalogen.

16. A method for alleviating or treating viral or bacterial infection symptoms, comprising administering a composition comprising 500 μg to 20,000 μg per day of plasmalogen to a human in need alleviating or treating infection symptoms,
wherein the plasmalogen is administered orally, by injection, or by infusion, and
wherein the method is a method of alleviating or treating infection symptoms of Rhizomelic Chondrodysplasia Punctata, Murid herpes virus 1, *P. aeruginosa* or *S. aureus*.

* * * * *